United States Patent [19]

Adams

[11] Patent Number: 5,314,042

[45] Date of Patent: May 24, 1994

[54] TREE STAND-TRANSPORT VEHICLE

[76] Inventor: Joseph B. Adams, 4408 SW. Maple La., Claremore, Okla. 74017

[21] Appl. No.: 933,104

[22] Filed: Aug. 20, 1992

[51] Int. Cl.$^5$ .............................................. A01M 31/02
[52] U.S. Cl. ................................... 182/187; 182/116; 182/20
[58] Field of Search ................. 182/187, 188, 116, 20, 182/129

[56] References Cited

U.S. PATENT DOCUMENTS

| 165,168 | 7/1875 | Rowland | 182/180 X |
|---|---|---|---|
| 5,009,283 | 4/1991 | Prejean | 182/116 |
| 5,064,020 | 11/1991 | Eagleson | 182/20 |
| 5,105,908 | 4/1992 | Freund | 182/129 X |
| 5,195,611 | 3/1993 | Untz | 182/129 |

*Primary Examiner*—Alvin C. Chin-Shue
*Attorney, Agent, or Firm*—Head & Johnson

[57] ABSTRACT

A rearrangeable assembly can take on either a tree stand configuration or an equipment transport configuration. A two section ladder is hinged for 180° rotation from a folded substantially horizontal condition in the transport configuration to an open substantially vertical condition in the stand configuration. A platform is hingedly connected for approximately 90° rotation between substantially horizontal conditions in either the stand configuration or the transport configuration. A main carriage with relatively large wheels connects beneath the ladder and a front carriage with relatively small wheels connects in front of the ladder in the transport configuration. Preferably, a steering frame connects to the platform in the transport configuration. Additionally, a brake for controlling the rate of rotation of the main carriage wheels is connected between the steering frame and the main carriage in the transport configuration. All of these connections are made by removable retaining pins so that the assembly can be quickly rearranged from the transport configuration to the stand configuration in which the ladder is fully extended and the platform is mounted at the top of the ladder in approximately a 95° relationship to the ladder so that the tree stand will lean slightly toward the tree.

19 Claims, 8 Drawing Sheets

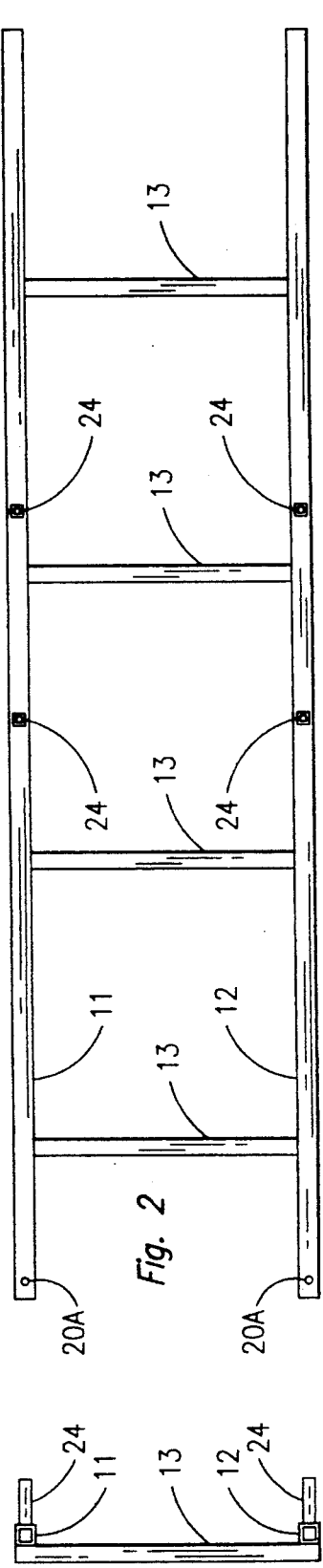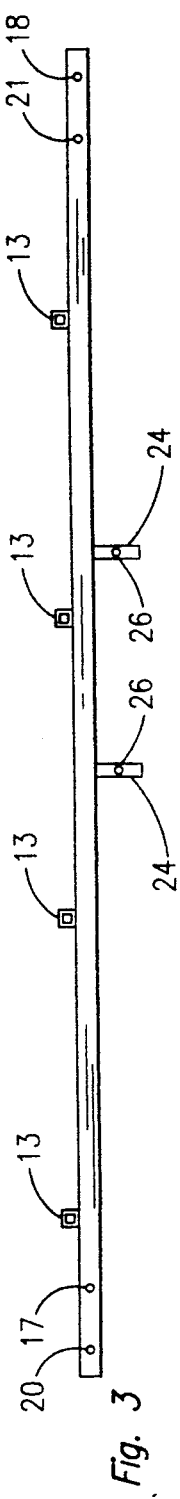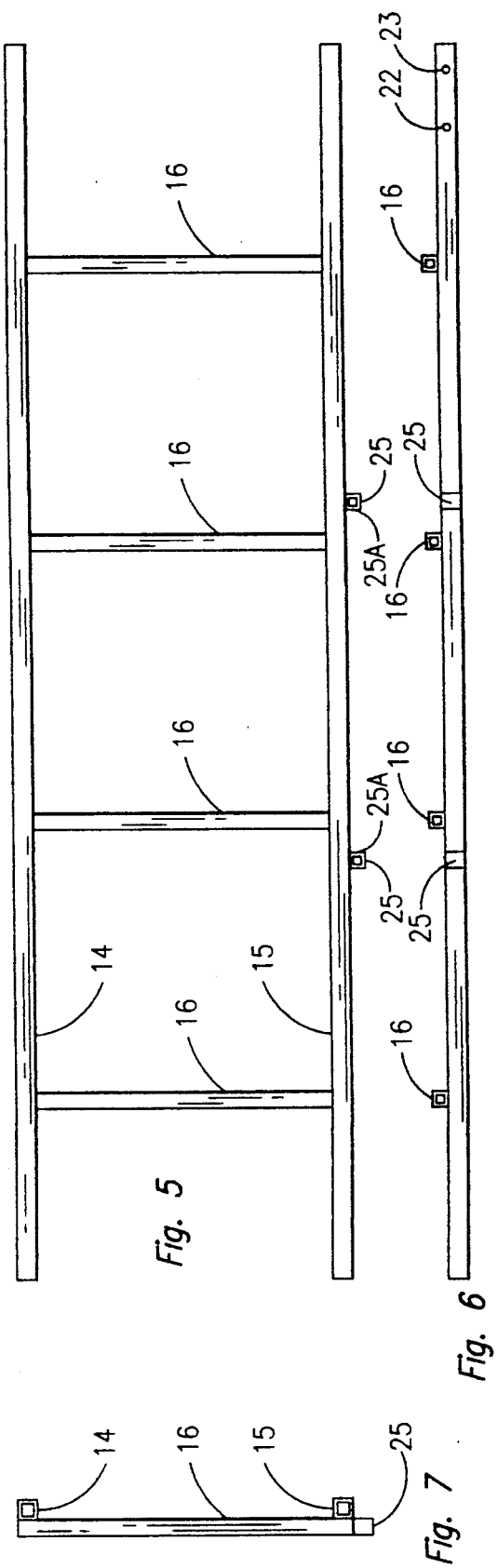

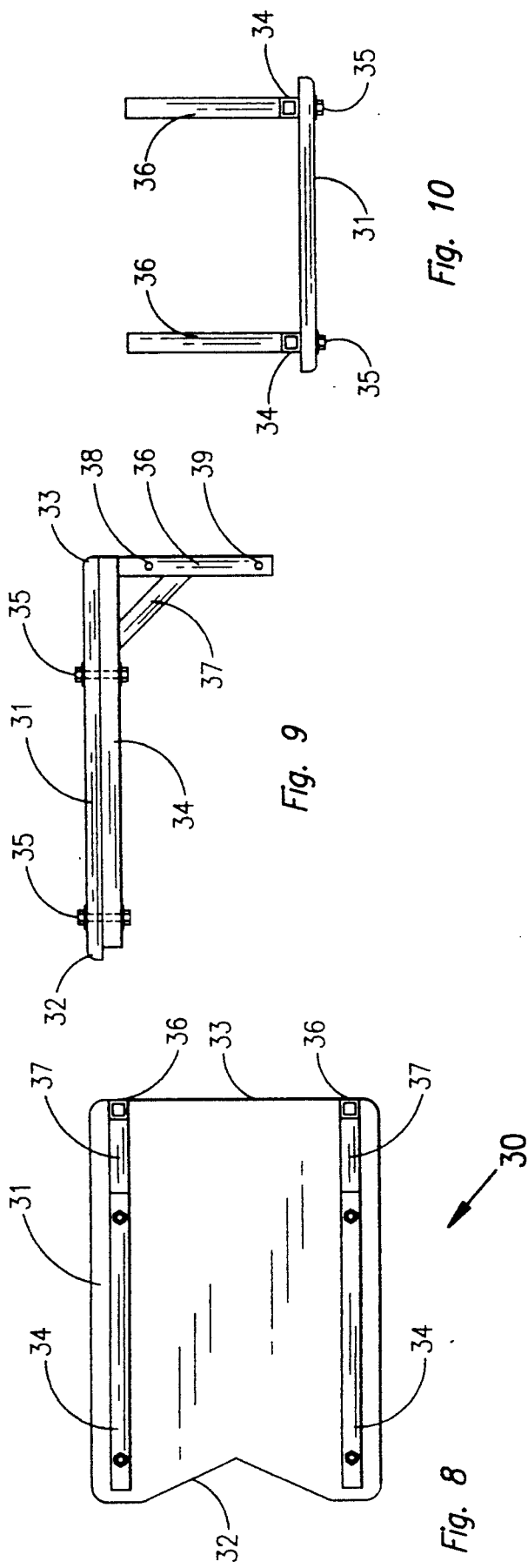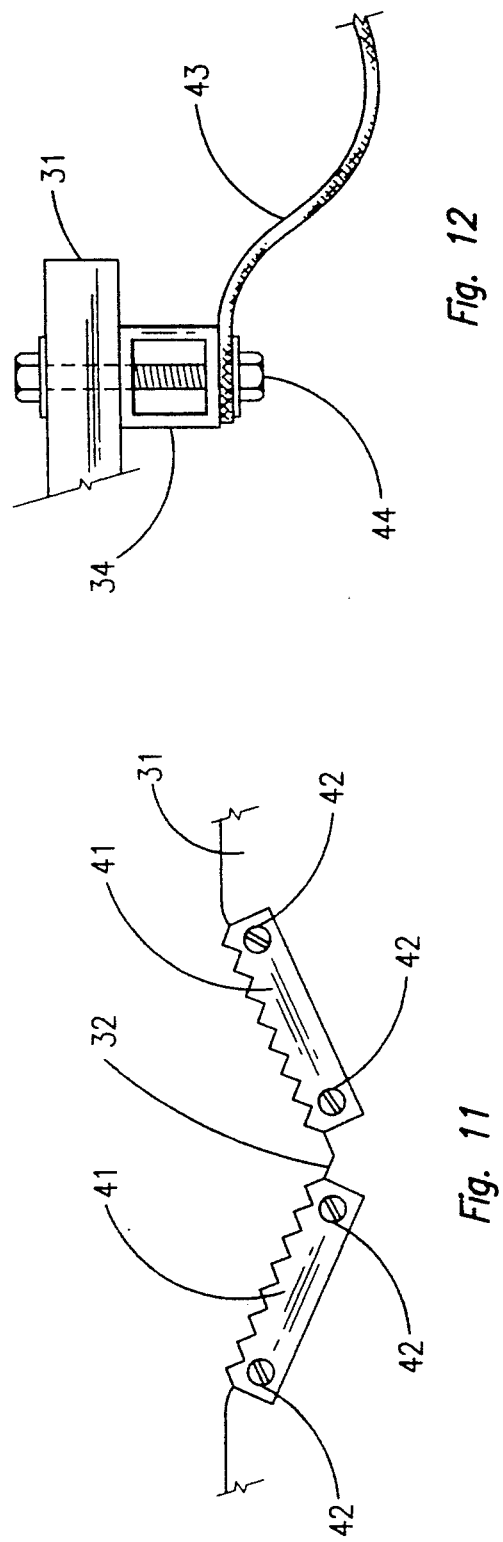

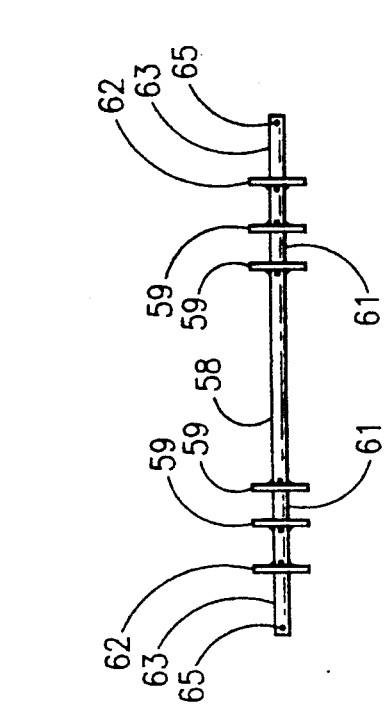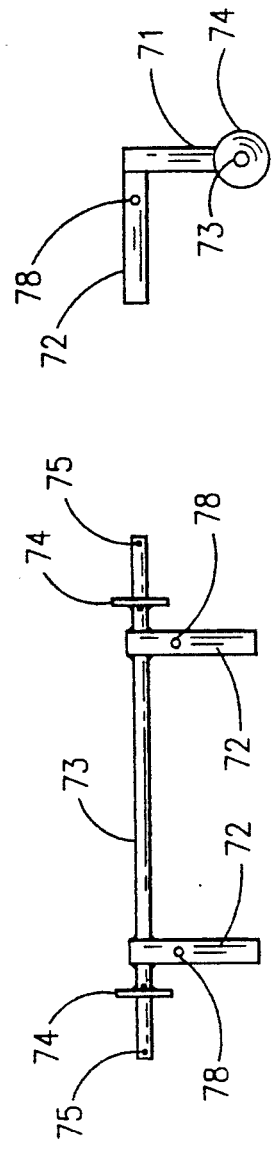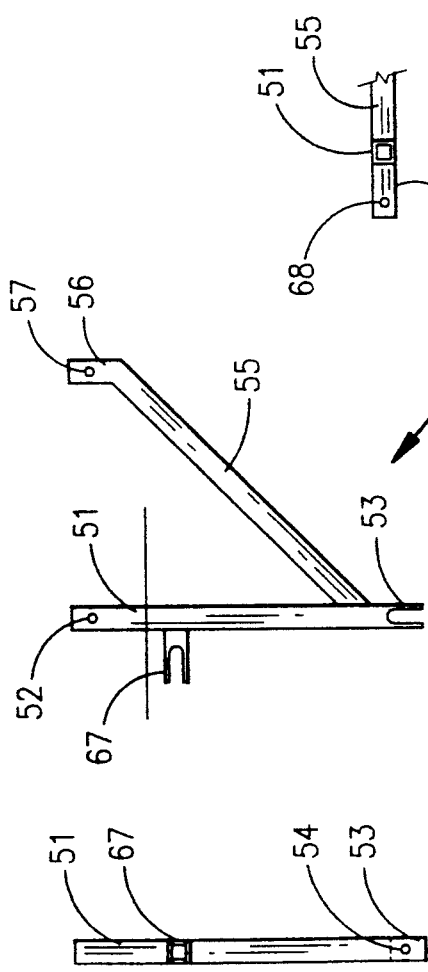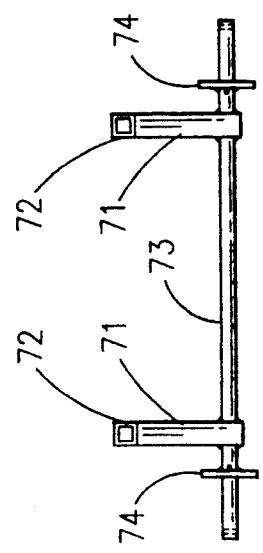
Fig. 16
Fig. 19
Fig. 18
Fig. 14
Fig. 13
Fig. 17
Fig. 15

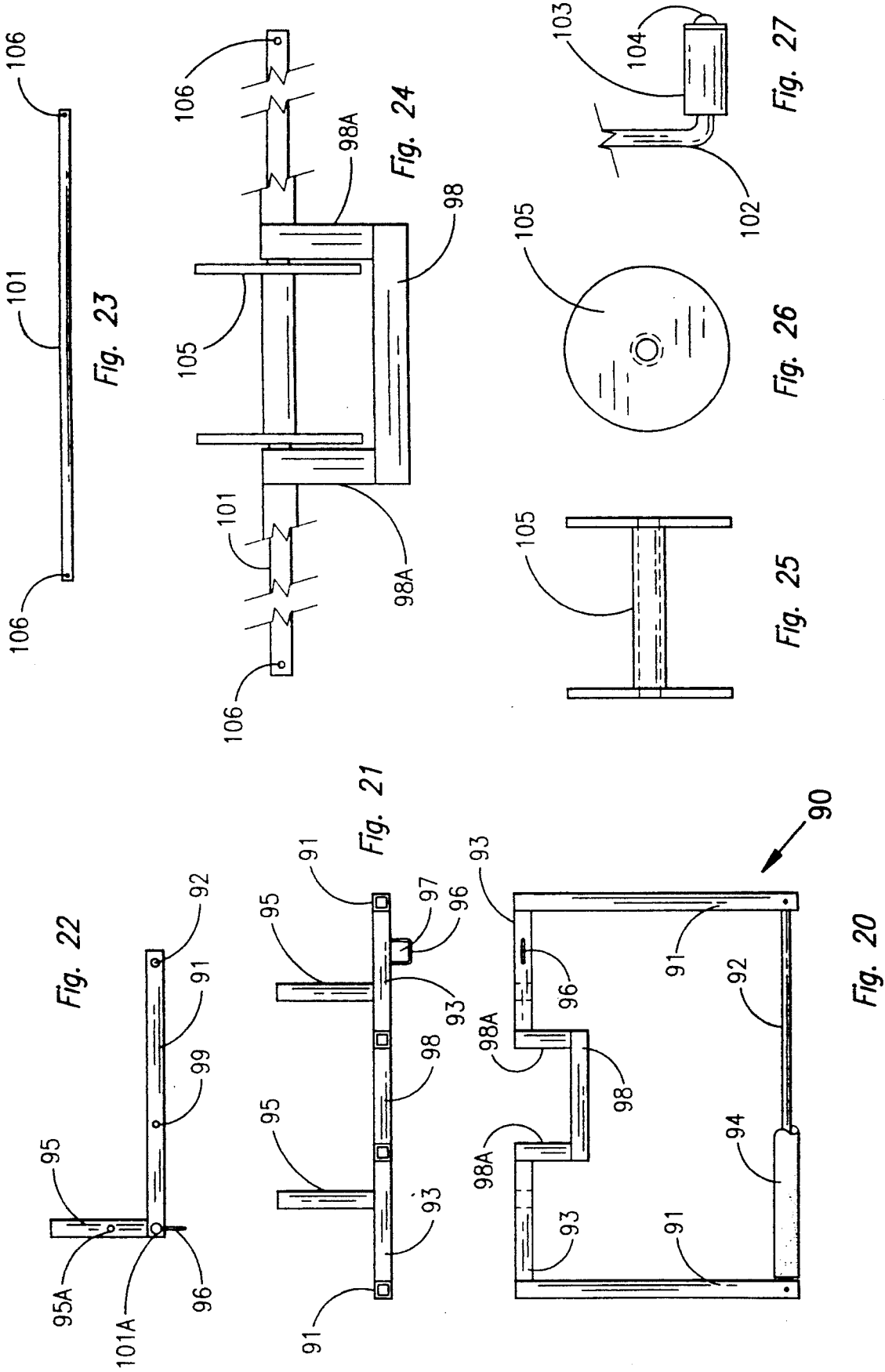

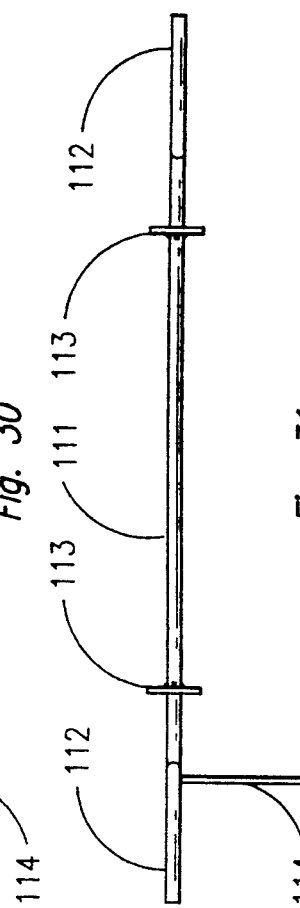
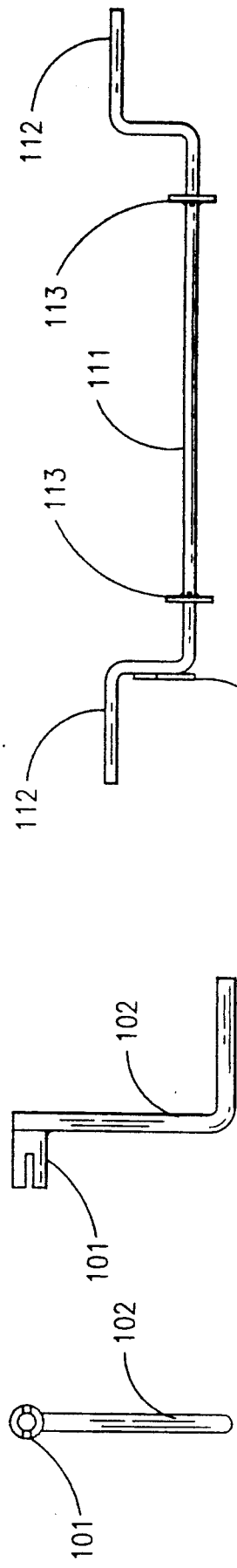
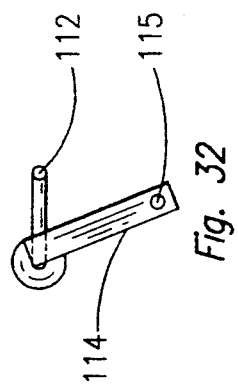
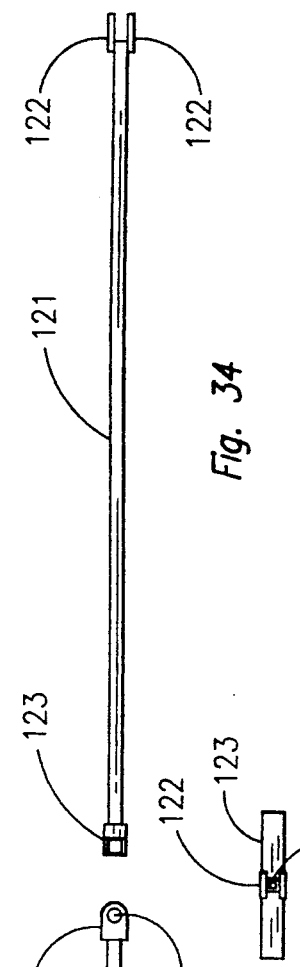
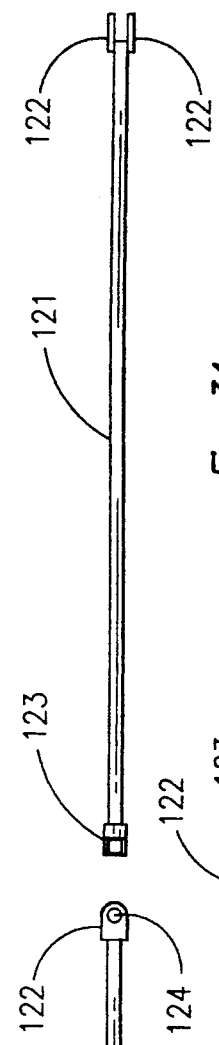
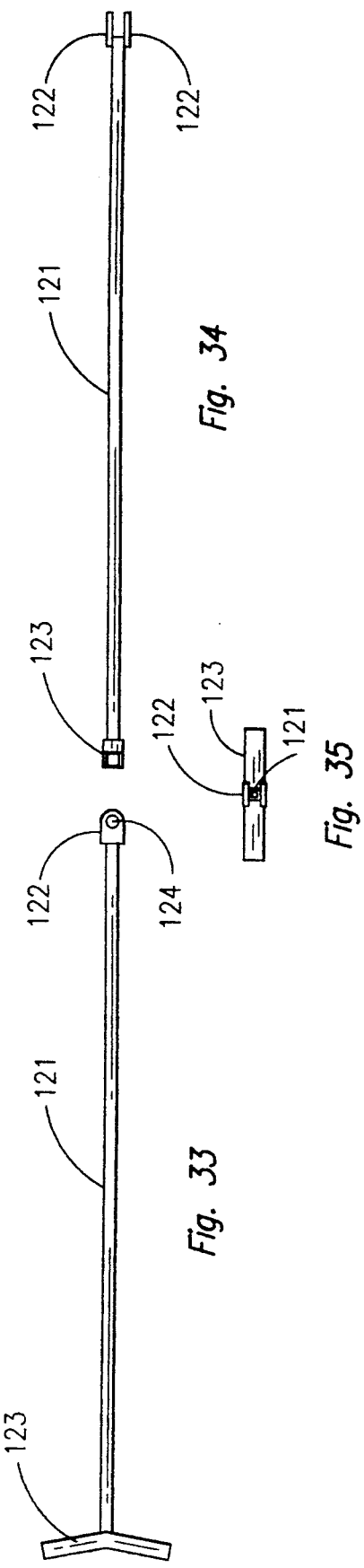
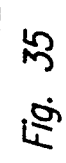

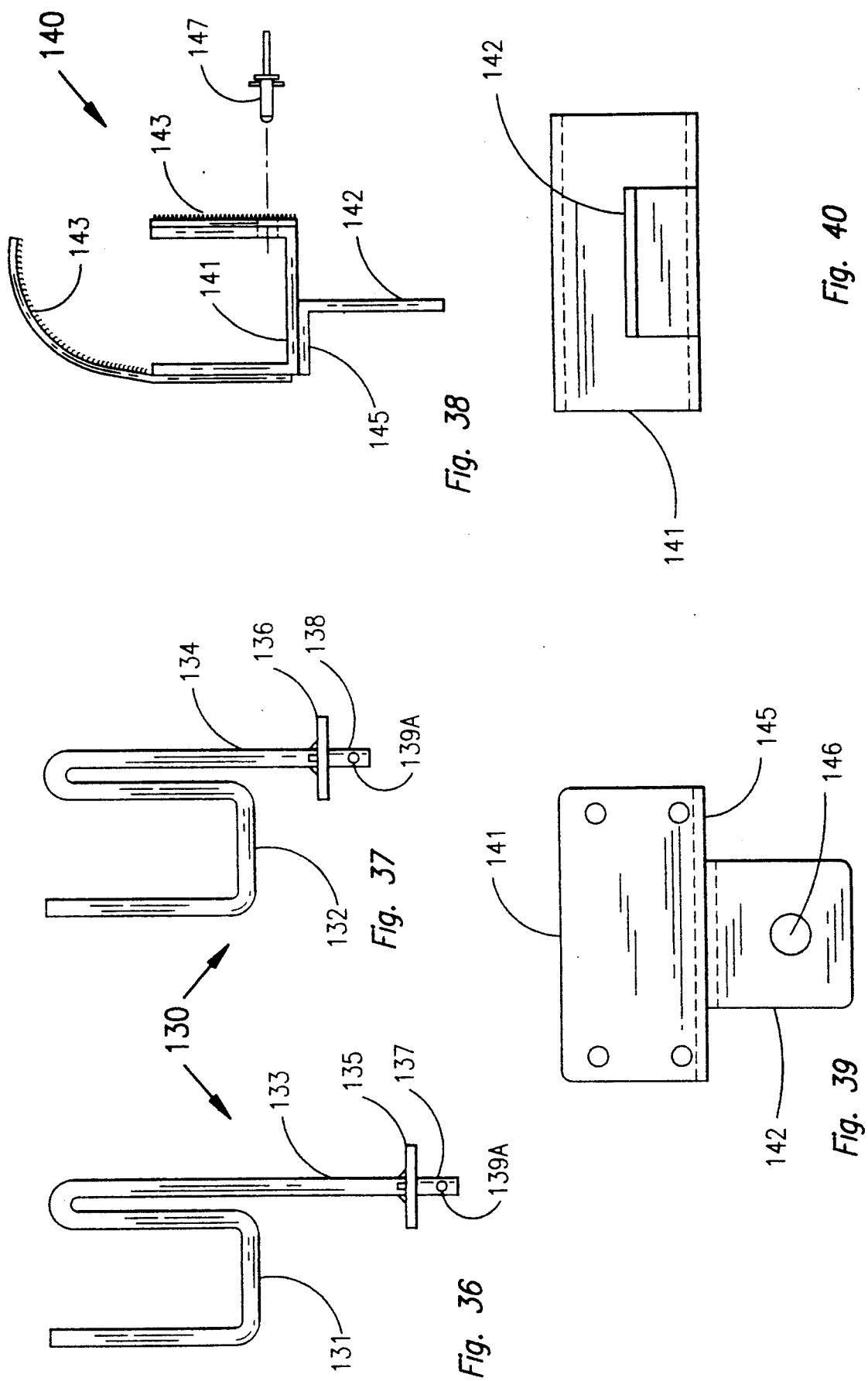

TREE STAND-TRANSPORT VEHICLE

BACKGROUND OF THE INVENTION

This invention relates generally to hunting equipment and more particularly concerns tree stands.

Presently known tree stands suffer from one or more variety of problems making their use cumbersome and impractical. Hunters often engage in their sport at locations that are quite distant if not remote from their means of transportation to the hunting area. Often, the chosen hunting site is reachable only by traversing difficult terrain. It is therefore necessary for the hunter to transport all of his equipment and supplies from the stopping point of his transportation to the hunting site. Tree stands, while desirable for hunting purposes, add to the array of equipment and supplies that must be transported by the hunter. Furthermore, by their very nature, stands are cumbersome under the very best of conditions. Those stands that disassemble for transport purposes still must be carried with the other equipment and add to the weight being carried by the hunter. For a single hunter, the array of equipment could necessitate multiple trips between the transport site and the hunting site and, if game is taken, require an additional trip on the return.

It is, therefore, an object of this invention to provide a tree stand which is an aid rather than a hindrance to the hunter in traveling to and from transport and hunting locations. Another object of the invention is to provide a tree stand that can be assembled in one configuration to be a transport vehicle and in another configuration to be a tree stand. Similarly, it is an object of this invention to provide a tree stand which can be used as a transport vehicle to carry the hunter's equipment and supplies from a transport location to a hunting location and it is also an object of this invention to provide a tree stand that can be used to transport the hunter's equipment, supplies and taken game from the hunting location to the transport location. Another object of this invention is to provide a tree stand-transport vehicle that is lightweight and easily to assemble and disassemble. A further object of this invention is to provide a tree stand-transport vehicle which is easily guided by a single hunter over difficult terrain and long distances.

SUMMARY OF THE INVENTION

In accordance with the invention a rearrangable assembly can take on either a tree stand configuration or an equipment transport configuration. A two section ladder is hinged for 180° rotation from a folded substantially horizontal condition in the transport configuration to an open substantially vertical condition in the stand configuration. A platform is hingedly connected for approximately 90° rotation between substantially horizontal conditions in either the stand configuration or the transport configuration. A main carriage with relatively large wheels connects beneath the ladder and a front carriage with relatively small wheels connects in front of the ladder in the transport configuration. Preferably, a steering frame connects to the platform in the transport configuration. Additionally, a brake for controlling the rate of rotation of the main carriage wheels is connected between the steering frame and the main carriage in the transport configuration. All of these connections are made by removable retaining pins so that the assembly can be quickly rearranged from the transport configuration to the stand configuration in which the ladder is fully extended and the platform is mounted at the top of the ladder in approximately a 95° relationship to the ladder so that the tree stand will lean slightly toward the tree.

Straps may also be provided on the platform and on the brake mechanism with the brake mechanism configured so as to provide a stand off bar between the ladder and the tree in the stand configuration, the straps on the platform and the brake member being girted around the tree to lock the tree stand in place. Preferably, the platform will have V-shaped toothed edges abutting the tree for more secure engagement therewith. The steering frame also includes a crankshaft assembly for assisting the hunter in loading equipment and game onto the ladder in the transport configuration.

BRIEF DESCRIPTION OF THE DRAWINGS

Other objects and advantages of the invention will become apparent upon reading the following detailed description and upon reference to the drawings in which:

FIG. 2 is a front elevation view of the inside section of the ladder of the tree stand-transport vehicle of FIG. 2;

FIG. 3 is a side elevation view of the ladder inside section of FIG. 2;

FIG. 4 is an end view of the ladder inside section of FIG. 2;

FIG. 5 is a front elevation view of the outside section of the ladder of the tree stand-transport vehicle of FIG. 2;

FIG. 6 is a side elevation of the ladder outside section of FIG. 2;

FIG. 7 is an end view of the ladder outside section of FIG. 2;

FIG. 8 is a bottom plan view of a preferred embodiment of the platform of the tree stand-transport vehicle of FIG. 1;

FIG. 9 is a side elevation view of the platform of FIG. 8;

FIG. 10 is a front elevation view of the platform of FIG. 8;

FIG. 11 is an enlarged partial bottom plan view of the platform of FIG. 8;

FIG. 12 is an enlarged partial front view illustrating the connection of a strap to the platform of FIG. 8;

FIG. 13 is a side elevation view of one of two frame members of a preferred embodiment of the main carriage of the tree stand-transport vehicle of FIG. 1;

FIG. 14 is a top plan view of a horizontal yoke portion of the main carriage members of FIG. 13;

FIG. 15 is a side elevation view of the main carriage of FIG. 13;

FIG. 16 is a side elevation view of the wheel shaft of the main carriage of FIG. 13;

FIG. 17 is a front elevation view of a preferred embodiment of the front carriage of the tree stand-transport vehicle of FIG. 1;

FIG. 18 is a top plan view of the front carriage of FIG. 17;

FIG. 19 is a side elevation view of the front carriage of FIG. 17;

FIG. 20 is a top plan view of a preferred embodiment of the steering frame of the tree stand-transport vehicle of FIG. 1;

FIG. 21 is a front elevation view of the steering frame of FIG. 20;

FIG. 22 is a side elevation view of the steering frame of FIG. 20;

FIG. 23 is a side elevation view of the crankshaft of the tree stand-transport vehicle of FIG. 1;

FIG. 24 is a front elevation view of a preferred embodiment of a crankshaft and spool mounted on the steering frame of FIG. 20;

FIG. 25 is a front elevation view of the spool of FIG. 24;

FIG. 26 is a side elevation view of the spool of FIG. 24;

FIG. 27 is a front elevation view with parts broken away of the handle of the crankshaft of FIG. 23;

FIG. 28 is a side elevation view of the handle connected to the crankshaft of FIG. 27;

FIG. 29 is a front elevation view of the handle of FIG. 28;

FIG. 30 is a front elevation view of a preferred embodiment of the brake shaft of the tree stand-transport vehicle of FIG. 1;

FIG. 31 is a top elevation view of the brake shaft of FIG. 30;

FIG. 32 is an end elevation view of the brake shaft of FIG. 30;

FIG. 33 is a side elevation view of a preferred embodiment of the brake linkage-stand-off of the tree stand-transport vehicle of FIG. 1;

FIG. 34 is a top plan view of the brake linkage-stand-off of FIG. 33;

FIG. 35 is an end view of the brake linkage-stand-off of FIG. 33;

FIG. 36 is a front elevation view of a preferred embodiment of a first gun support for the tree stand-transport vehicle of FIG. 1;

FIG. 37 is a front elevation view of a preferred embodiment of a second gun support for the tree stand-transport vehicle of FIG. 1;

FIG. 38 is a front elevation view of a preferred embodiment of a flashlight holder for the tree stand-transport vehicle of FIG. 1;

FIG. 39 is a side elevation view of the flashlight holder of FIG. 38;

FIG. 40 is a bottom plan view of the flashlight holder of FIG. 38; and

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

As used in this description, the terms horizontal and vertical are not to be taken in their strict sense of being parallel to or perpendicular to the horizon but rather are used to generally distinguish between planar relationships as tending to approximate either the horizontal or the vertical.

Figure 1:
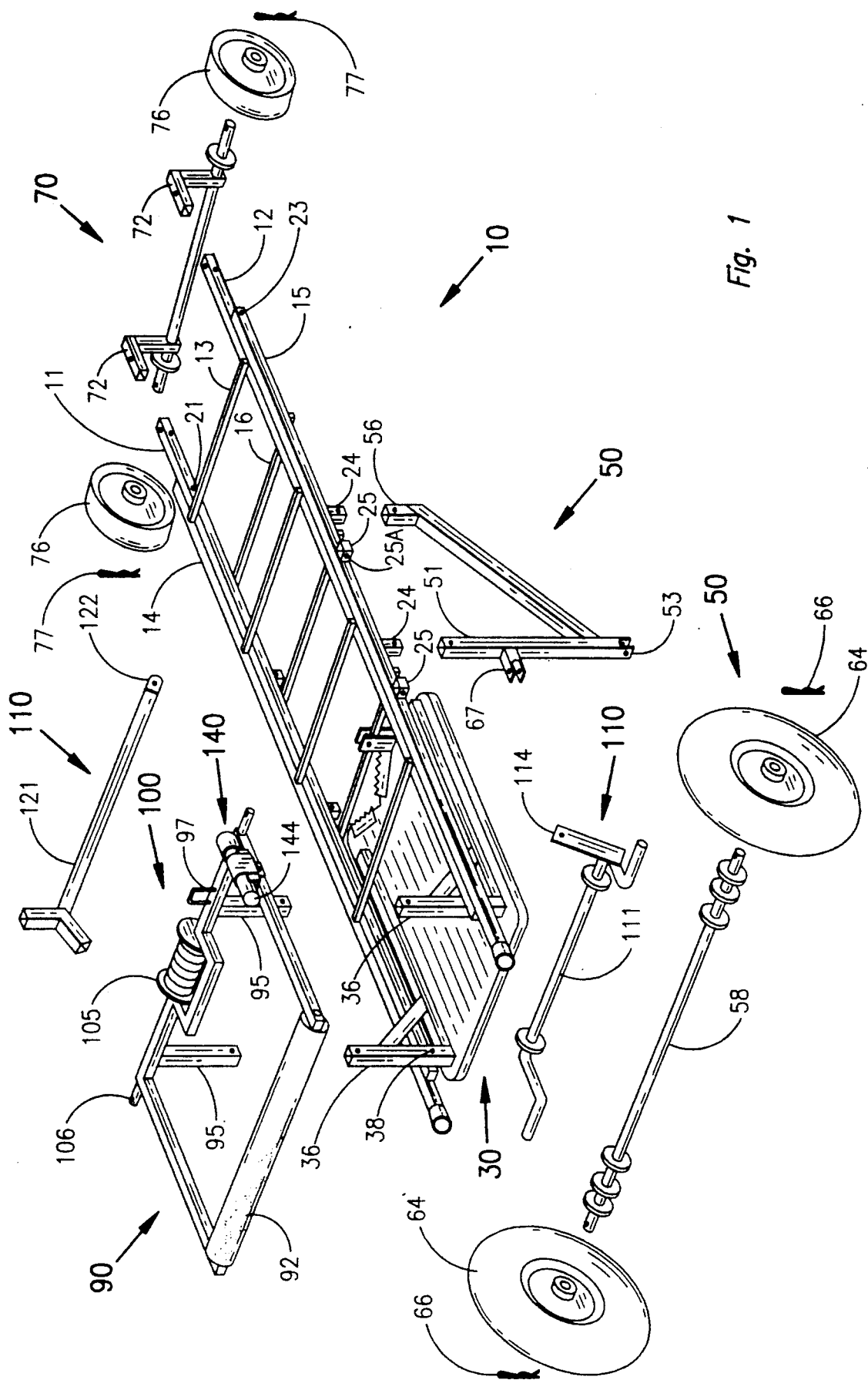
FIG. 1 is a perspective view of a preferred embodiment of the tree stand-transport vehicle in a disassembled state with components aligned for assembly into the transport vehicle configuration.

Turning first to FIG. 1, the tree stand-transport vehicle is illustrated in a disassembled state with its components aligned for assembly into a transport configuration. The components of the tree stand-transport vehicle include a ladder 10, a platform 30, a main carriage 50, a front carriage 70, a steering frame 90 and a brake-stand-off 110.

The ladder 10 is shown in greater detail in FIGS. 2 through 7. The ladder 10 consists of two sections, one consisting of a first pair of square tubular struts 11 and 12 spaced apart and connected in parallel relationship by rungs 13 and the other section consisting of a second pair of square tubular struts 14 and 15 spaced apart and connected in parallel relationship by rungs 16. The rungs 16 of the second section are slightly longer than the rungs 13 of the first section so that the first section struts 11 and 12 can nestle snugly between the second section struts 14 and 15, as can best be seen in FIG. 1. As shown, the first section struts 11 and 12 are provided with pivot holes 17 and 18 proximate opposite ends thereof and pinholes 20 and 21 proximate opposite ends thereof. The second section struts 14 and 15 are provided with a pivot hole 22 and a pinhole 23 proximate one end thereof. As can best be seen in FIG. 1, the first section struts 11 and 12 are inserted between the second section struts 14 and 15 with the ladder pivot holes 17 on the first section aligned with the ladder pivot holes 23 on the second section. Bolts (not shown) inserted through the aligned pivot holes 17 and 23 provide a hinged connection between the two ladder sections. When the first section is rotated approximately 180° from the position shown in FIG. 1 so that the two ladder sections are fully extended, the ladder pinholes 20 and 22 will be aligned so that a retaining pin (not shown) can be inserted in each of the aligned pairs of pinholes 20 and 22 to lock the ladder 10 in the fully extended condition. The inside or first section of the ladder also has two pairs of studs 24 which extend substantially perpendicularly from the struts 11 and 12 and transverse to the section along the mid to rear portion thereof. The second or outside ladder section has a pair of channels 25 mounted on the outside surface of one of the tubular struts 15. The studs 24 are provided with apertures 26. The channels 25 provide a substantially square access transverse to the strut 15 to which they are attached.

Turning now to FIGS. 8 through 11, the platform 30 of the tree stand-transport vehicle is illustrated in more detail. The platform consists of a substantially rectangular board or flat member 31 having one V-shaped edge 32 opposite a front edge 33. The board 31 has a pair of supporting struts 34 extending parallel to its side edges and secured to the board 31 by bolts 35. Each of the support struts 34 has a leg 36 fixed to the end of the strut 34 approximate the front edge 33 of the board 31. The legs 36 extend approximately perpendicularly from the supporting struts 34 and preferably at an angle of approximately 95°. The legs 36 are further secured to the struts 34 by braces 37. Each of the legs 36 has a pivot hole 38 and a pinhole 39. As shown in FIG. 1, the platform 30 is hinged between the inside section struts 11 and 12 of the ladder 10 by aligning the platform pivot holes 18 on the struts 11 and 12 with the pivot holes 38 on the platform legs 36 and inserting bolts (not shown) through the aligned holes 18 and 38. As shown in FIG. 1, the board 31 extends in a substantially horizontal position under the ladder 10 and the legs 36 extend upwardly in substantially a vertical condition. Approximately 90° rotation of the platform 30 about its hinge connection points will bring the pinholes 39 in the platform legs 36 into alignment with the pinholes 21 in the struts 11 and 12 of the inside ladder section so that retaining pins (not shown) inserted through the aligned holes 21 and 39 will lock the platform 30 to the ladder 10 with the board 31 in approximately 95° relationship to the ladder struts 11 and 12. Preferably, the V-edge 32 of the board 31 will be fitted with teeth 41 secured to the board 31 by screws 42 or other suitable fastening means. Finally, the platform 30 may also be fitted with straps 43 connected to the platform 30 by bolts 35 at opposite ends from front edge 33 through board 31 and struts 34 as is shown in FIG. 12.

The main carriage 50 of the tree stand-transport vehicle is illustrated in detail in FIGS. 13 through 16. The carriage 50 consists of a pair of vertical members 51 each having an upper end with a mounting hole 52 extending therethrough and a lower end having a vertical yoke 53 with apertures 54 through the arms of the yoke 53. Extending at approximately 45° upwardly from the lower portion of the vertical member 51 is an angled member 55 which terminates in a vertical portion 56 having a mounting hole 57 at the same level as the mounting hole 52 in the vertical member 51. As can best be seen in reference to FIG. 1, the tubular members 51 and 56 of the frame of the main carriage 50 align with the studs 24 which extend downwardly from the struts 11 and 12 on the inner ladder section. With the studs 24 inserted into the tubular sections 52 and 57, the apertures 26 through the studs 24 align with the mounting holes 52 and 57 on the frame of the main carriage 50 so that returning pins (not shown) inserted through the aligned holes 26 and 26 and 57, lock the main carriage 50 to the ladder 10. A main carriage shaft 58 has pairs of parallel disks 59 defining shaft segments 61 which are journalled for rotation in the vertical yokes 53 of the carriage frame vertical members 51 and secured in place by retaining pins (not shown) inserted through the yoke apertures 54. The shaft 58 also has exterior disks 62 fixed to it so that the end portions 63 can be inserted into the main carriage wheels 64 for rotation on the shaft 58. The end portions 63 of the shaft 58 have apertures 65 into which retaining pins 66 may be inserted to lock the wheels 64 on the shaft 58. Each of the vertical members 51 is also fitted with a horizontal yoke 67 along a mid portion thereof with vertically aligned apertures 68 extending through the arms of each of the yokes 67.

The front carriage 70 of the tree stand-transport vehicle is illustrated in greater detail in FIGS. 17 through 19. The front carriage 70 includes a frame consisting of a pair of vertical members 71 connected to a pair of horizontal members 72 in an L-shaped configuration. The free end of the vertical members 71 are connected to a shaft 73 and disks 74 are mounted on the shaft 73 exterior to the vertical member 71. The ends of the shaft 73 are provided with holes 75 so that, as best seen in FIG. 1, front carriage wheels 76 can slide onto the shaft 73 against the disk 74 and retaining pins 77 inserted into the holes 75 to secure the wheels 76 in place on the shaft 73. The horizontal members 72 are provided with holes 78 which align with the pinholes 20 in the struts 11 and 12 of the interior section of the ladder 10 so that the horizontal members 72 can be inserted into the tubular struts 11 and 12 and retaining pins (not shown) inserted into the aligned holes to lock the front carriage 70 in place on the ladder 10.

The steering frame 90 is illustrated in FIGS. 20, 21 and 22. The steering frame is formed of side members 91 connected at one end by a handle member 92 and at the other end by sections of tubing connected together to form a front frame portion 93. Preferably, the handle member 92 will be covered by a section of foam tubing 94 or the like for comfort in manipulating the handle member 92. Extending from the front frame portion 93 in perpendicular alignment to the remainder of the steering frame 90 are a pair of elongated studs 95 which, as can best be seen in relation to FIG. 1, drop into the tubular legs 36 of the platform 30. The studs 95 are provided with pin holes 95A which align with the pinholes 39 in the legs 36 so that retaining pins (not shown) can be inserted into the aligned holes to lock the steering frame 90 to the platform 30. The front frame portion 93 is also fitted with a bent rod segment 96 which forms a guide aperture 97 above the steering frame 90 when the steering frame 90 is connected to the platform 30. Preferably, as shown, the front frame portion 93 has its tubular members arranged so as to form a U-portion 98 and 98A centrally located in the front frame portion 93. As can best be seen in FIG. 1, the steering frame 90 includes a crank shaft assembly 100 which is shown in more detail in FIGS. 22 through 29. The crank shaft assembly 100 includes a crank shaft 101 which extends through and is journalled for rotation in the front frame portion 93 into apertures 101A of the steering frame 90. One end of the crank shaft 101 is fitted with an L-shaped handle 102 and the grip portion of the handle 102 is fitted with a plastic tube 103 which is free to rotate on the handle 102 for easy operation of the crank and is held in place on the handle 102 by an axle nut 104. A spool 105 mounted centrally on the crank shaft 101 rotates with the shaft 101 in the U-portion 98 of the front frame portion 93 of the steering frame 90. The ends of the shaft 101 are provided with holes 106 through which pins (not shown) are inserted to engage in slot 101 or handle 162. A rope 106 wound on the spool 105 preferably is fitted with a hook (not shown) on its free end.

The brake-stand-off 110 is illustrated in greater detail in FIGS. 30 through 35. A shaft 111 having L-shaped end portions 112 has disks 113 fixed thereto so that, as can best be seen in FIG. 1, the shaft 111 can be inserted into the horizontal yokes 67 on the main carriage 50 with the disks 113 between the yokes 67 to maintain the shaft 111 in its proper location on the main carriage 50. Retaining pins (not shown) can then be inserted into the yoke apertures 68 to secure the shaft 111 in place. The L-shaped portion 112 of the shaft 111 has an arm 114 extending in a radial relation with respect to the shaft 111 and the free end of the arm 114 has a hole 115 therethrough. As can best be seen in reference to FIG. 1, the L-portions 112 of the shaft 111 will come into and out of engagement with the surface of the main carriage wheels 64 if the shaft 111 is rotated by the operation of the arm 114. Operation of the arm 114 is accomplished by the use of a rod or tubular member 121 having a yoke 122 at one end and a slightly forked handle 123 at its other end. The yoke 122 has apertures 124 through it so that the free end of the arm 114 can be inserted in the yoke 122 and a retaining pin inserted through the aligned holes 114 and 124 in the arm 115 and the yoke 122. This connection is made after the tubular member 121 is inserted through the guide aperture 97 on the steering frame 90 with the forked handle 123 being accessible proximate the handle member 93 of the steering frame 90. The forked handle 123 of the brake-stand-off 110 may also be fitted with a strap 125 fixed to one side of the handle 123 and connectible to the other side of the handle 123 for reasons to be hereinafter explained.

Looking at FIG. 36 and 35, the component parts of a gun rack 130 are illustrated. The gun rack 130 consists of two U-shaped gun supports 131 and 132 connected to Vertical members 133 and 134 having disks 135 and 136 proximate their lower portion to define an insert portion 137 and 138 on each support 131 and 132. Looking at FIG. 5, the insert portions 137 and 138 are fitted into the channels 25 provided on the side of one of the struts 15 of the outside ladder section until the disks 135 and 136 are seated against the tops of the channels 25 and held in place with retaining pins, such as item 66 (FIG. 1), through holes 139A in 137 and 138, and through channels 25 and their retaining pin holes 25A (FIG. 5). The gun or rifle (not shown) can then be rested within the U-shaped ports 131 and 132 for transport with the tree stand-transport vehicle.

Turning to FIGS. 38, 29 and 40, a flashlight holder 140 for use with the tree stand-transport vehicle is illustrated. The flashlight holder 140 consists of a U-shaped channel 141 vertically supported at its bottom by a vertical support member 142. A hook and loop type fastener 143 is connected to the arms of the channel 141 so that, as shown in FIG. 1, a flashlight 144 can be secured in the channel 141. The bottom edge 145 in the flashlight holder 140 is seated on the top surface of one of the side members 91 of the steering frame 90 with a hole 146 through the vertical support 142 aligned with a hole 99 in the side member 91 so that a retaining pin (not shown) can be inserted through the aligned holes 99 and 146 to lock the flashlight holder 140 in place on the steering frame 90. The hook and loop fastener 143 can be secured to the arms of the channel 141 by the use of pop rivets 147.

Turning again to FIG. 1, the tree stand/transport vehicle is illustrated aligned for assembly into its transport configuration. In this condition, the ladder 10 is folded. The platform 30 is secured to the rear end of the inside ladder section by bolts (not shown) extending through the pivot holes 18 in the struts 11 and 12 which are aligned with the pivot holes 38 in the platform legs 36. The main carriage 50 is secured to the inside section of the ladder 10 by the insertion of the ladder studs 24 into the vertical portions 51 and 56 of the main carriage 50 and insertion of the retaining pins (not shown) into the aligned holes 26, 52 and 57 to secure the carriage 50 in place. The carriage shaft 58 is inserted into the vertical mounting frame yokes 53 and locked in place by inserting retaining pins (not shown) through the apertures 54 in the yokes 53. The wheels 64 are mounted on the shaft 58 and the retaining pins 66 inserted into the apertures 65 on the shaft 58 to lock the wheels 64 in place. The front carriage horizontal members 72 are inserted into the struts 11 and 12 of the inside ladder section and retaining pins (not shown) inserted into the aligned holes through the struts 11 and 12 and the horizontal members 72 to lock the front carriage 70 in place on the ladder 10. Elongated studs 95 of the steering frame 90 are then dropped into the upstanding legs 36 of the platform 30 and removable pins (not shown) inserted into aligned holes 39 (FIG. 9) and 96, 95A (FIG. 22) to lock the steering frames 90 in place on the platform 30. The brake shaft 111 is then mounted on the horizontal yokes 67 on the main carriage 50 and retaining pins (not shown) inserted in the yoke apertures 68 to secure the brake shaft 111 in place. The tubular member 121 of the brake handle is then inserted through the guide aperture 97 on the steering frame 90 and the yoke 122 on the end of the tubular member 121 connected to the arm 114 on the brake shaft 111 by a retaining pin (not shown) to complete this linkage. The gun rack supports 131 and 132 are connected to the ladder by dropping their insert portions 137 and 138 snugly into the channels 25 provided on the ladder and pinned. The flashlight holder 140 is secured in place on the side member 91 of the steering frame 90 and a flashlight 144 secured in the holder 140 to direct its light beam forward of the tree standtransport vehicle. The ladder portion of the device may be covered by a canvas or plastic material (not shown) for carrying purposes. The crank 100 can be used to assist in pulling objects, such as game, onto the surface of the substantially horizontal ladder 10. Of course, the hook on the rope 106 may be connected to the steering frame 90 and a pulley system used to provide mechanical advantage in loading heavier game onto the tree stand/transport vehicle. The strap on the platform 30 can be used to secure the game or other objects on the horizontal ladder 10.

As shown, the main carriage wheels 64 are of substantially greater diameter than the front carriage wheels 76. This greater diameter of the rear wheels 64 permits the operator of the tree stand-transport vehicle to press downwardly on the handle member 92 so as to tip the front carriage 70 upwardly above the ground. This is useful in steering and negotiation of changes in terrain and other obstacles in the path of the transport vehicle. By tipping the front carriage 70 up, the front carriage wheels 76 can even be raised above the level of a pick-up tail gate so that the tree stand-transport vehicle can be readily loaded into a pick-up by a single operator. As shown, most of the components are made of tubular steel or aluminum and therefore the complete tree stand-transport vehicle is extremely light, in the order of fifty to seventy pounds, and easily handled by a single operator. Thus, a single hunter will have ready access to hunting areas in even the most distant and rugged terrain because the hunter will be enabled to bring all of his equipment to the desired hunting location on his tree stand-transport vehicle in its transport configuration.

Figure 41:
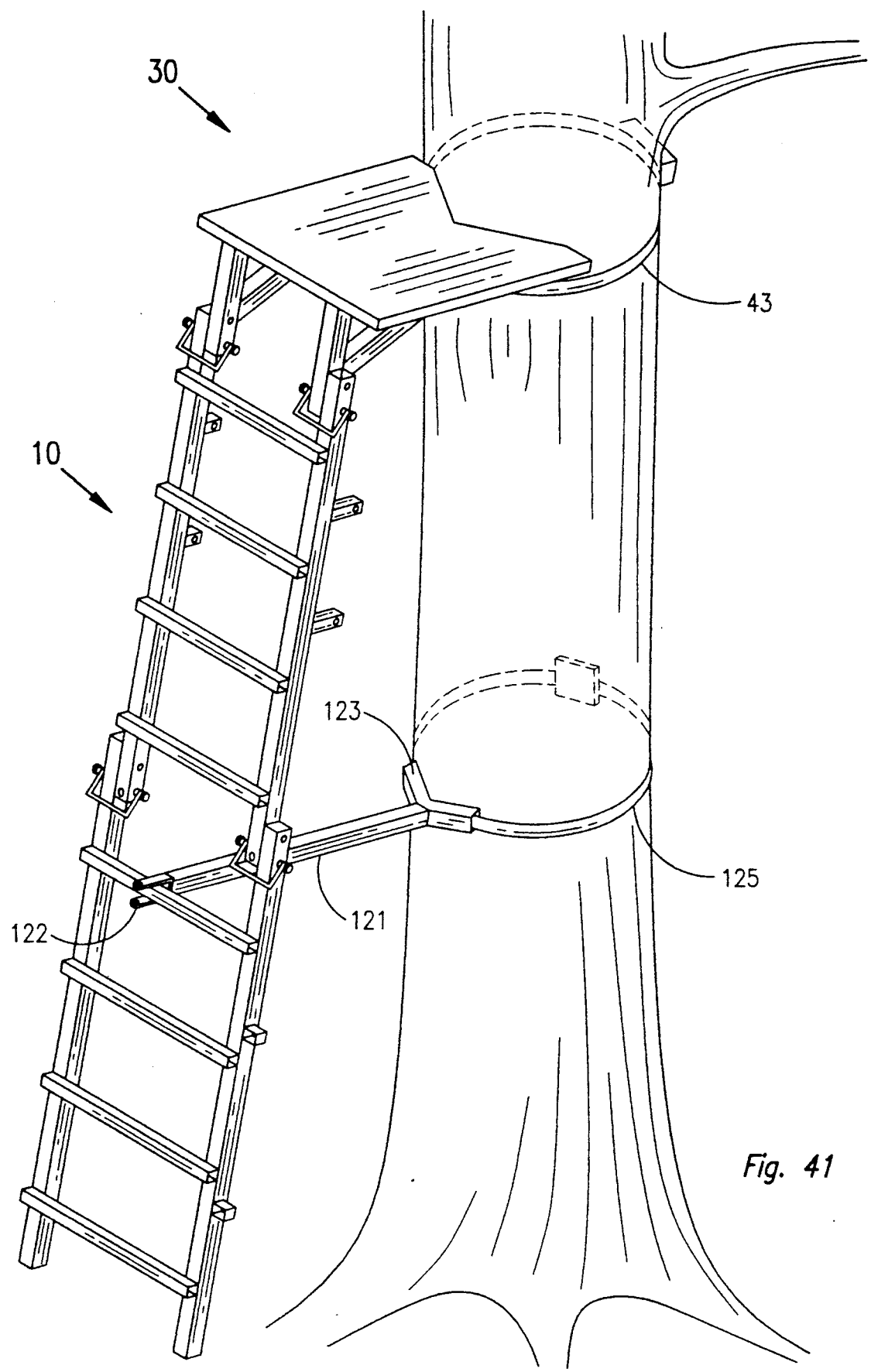
FIG. 41 is a perspective view illustrating the tree standtransport vehicle of FIG. 1 mounted on a tree in its stand configuration.

At the hunting location, the tree stand-transport vehicle is readily converted into its stand configuration illustrated in FIG. 41, again by a single operator. The appropriate retaining pins are disengaged and the brake-stand-off 110 is removed. The appropriate retaining pins are removed from the steering frame 90 and the steering frame 90 disengaged from the platform 30. The appropriate retaining pins are withdrawn from the front carriage 70 and the front carriage 70 disengaged from the ladder 10. The appropriate retaining pins are then removed from the main carriage 50 so that the main carriage 50 can be disconnected from the ladder 10. Further breakdown of the main carriage 50 is possible but not necessary. Platform 30 is rotated so as to be in its 95° relationship to the ladder 10 and the pins reinserted to lock the platform 30 in its position on the ladder 10. One section of the ladder 10 can then be approximately rotated 180° in relation to the other section until the ladder is fully extended and the appropriate retaining pins inserted to lock the ladder 10 in this extended condition. With the ladder 10 thus extended and the platform 30 in its approximately 95° relationship, the tree stand-transport vehicle can be stood on its lower end with the teeth 41 on the V-shaped edge 32 of the platform 30 against a tree, post or other available vertical support. The 95° relationship of the platform 30 to the ladder 10 enables the base of the ladder 10 to be slightly further away from the tree than the hinged edge 33 of the platform 30 so that the tree stand will tend to lean toward the tree. The appropriate pin is then removed from the tubular member 121 of the brake 110 and the yoke 122 slipped over one of the rungs 13 or 16 on the ladder 10, preferably on the fourth rung above ground for a ladder having eight rungs as illustrated in FIGS. 2 and 5. The appropriate retaining pin can then be reinserted in the yoke apertures 124 to lock the tubular member in place on the ladder 10. The forked handle 123 on the tubular member 121 of the brake 110 can then be brought into abutment with the tree. The strap connected to the forked handle 123 and the strap connected to the platform 30 can then be girted around the tree to secure the ladder 10 in position in relation to the tree. This completes the transformation of the tree stand-transport vehicle from the transport configuration to the stand configuration. A single operator can perform the entire transformation in approximately fifteen minutes.

Thus, it is apparent that there has been provided, in accordance with the invention, a tree stand-transport vehicle that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A rearrangable assembly having a tree stand configuration and an equipment transport configuration comprising:
   a ladder substantially horizontally disposed in the transport configuration and substantially vertically disposed in the stand configuration;
   a platform hingedly connected at an edge thereof to a rearward end of said ladder for rotation to a substantially horizontal disposition in the stand and transport configurations;
   removable steering frame means at said rearward end of said ladder;
   detachable means for locking said platform to said ladder in said stand and transport configurations; and
   main wheeled carriage means connected by removable pins to and beneath said ladder at a transverse position slightly rearwardly of a midpoint of said ladder for traversing the assembly over land in the transport configuration, said means being detachable from said ladder in the stand configuration by removal of said pins.

2. A rearrangable assembly having a tree stand configuration and an equipment transport configuration comprising:
   a ladder substantially horizontally disposed in the transport configuration and substantially vertically disposed in the stand configuration;
   a platform hingedly connected at an edge thereof to one end of said ladder for rotation to a substantially horizontal disposition in the stand and transport configurations, said platform having members extending approximately perpendicularly upwardly therefrom when said platform is rotated to the transport configuration and the assembly further comprising steering means connected by removable pins to said upwardly extending members for controlling the movement of the assembly in the transport configuration;
   detachable means for locking said platform to said ladder in said stand and transport configurations; and
   main carriage means connected by removable pins to and beneath a rearward portion of said ladder for traversing the assembly over land in the transport configuration, said means being detachable from said ladder in the stand configuration by removal of said pins.

3. An assembly according to claim 2 further comprising a crank means mounted on said steering means having a rope extending therefrom for pulling objects onto the ladder in the transport configuration.

4. An assembly according to claim 3 further comprising a hook on a free end of said rope for connection to said steering means and pulley means mounted on said rope to provide a mechanical advantage in pulling said objects.

5. An assembly according to claim 2 further comprising a forward wheeled carriage means connected by removable pins to and beneath a forward end of said ladder for traversing the assembly over land in the transport configuration, said means being detachable from said ladder in the stand configuration by removal of said pins.

6. A rearrangable assembly having a tree stand configuration and an equipment transport configuration comprising:
   a ladder having a first pair of parallel tubular struts spaced by a plurality of rungs fixed therebetween hingedly connected at an end portion thereof between and to an end portion of a second pair of parallel tubular struts spaced by a plurality of rungs fixed therebetween for 180 degree rotation from a folded substantially horizontal condition in the transport configuration to an open substantially vertical condition in the stand configuration, said end portions having apertures therethrough aligned in the stand configuration for insertion of removable pins therein to lock said pairs of struts in the stand configuration, said first pair of struts each having a pair of substantially perpendicular studs each having an aperture therethrough depending from another end portion thereof in the transport configuration;
   a platform having tubular members extending approximately perpendicularly therefrom proximate one edge thereof and hingedly connected between said other end portion of said first pair of struts for approximately 90 degree rotation between a substantially horizontal condition with said members extending downwardly in the stand configuration and a substantially horizontal condition with said members extending upwardly in the transport configuration, said members and said another end portion of said first pair of struts having apertures therethrough aligned in the stand and transport configurations for insertion of removable pins therein to lock said members to said first pair of struts in the stand and transport configurations;
   a main carriage having a tubular frame for receiving said studs therein with the assembly in the transport configuration, said frame having apertures aligned with said stud apertures for insertion of removable pins therein to lock said main carriage to said studs in the transport configuration; and a front carriage having studs extending substantially horizontally therefrom for insertion into said one end of said first pair of tubular struts in the transport configuration, said studs having apertures aligned with said strut apertures for insertion of removable pins therein to lock said front carriage to said struts in the transport configuration.

7. An assembly according to claim 6 further comprising a steering frame having a pair of studs substantially perpendicularly depending therefrom for insertion into said platform tubular members in the transport configuration, said studs having apertures aligned with said member apertures for insertion of removable pins therein to lock said steering frame to said platform members in the transport configuration.

8. An assembly according to claim 7 further comprising a crank shaft journalled for rotation on said steering frame having a rope extending therefrom for pulling objects onto the ladder in the transport configuration.

9. An assembly according to claim 6, said main carriage having a frame and a pair of wheels journalled for rotation about a shaft on said frame and said front carriage having a frame and a pair of wheels journalled for rotation about a shaft on said frame.

10. An assembly according to claim 9, said main carriage wheels having a substantially greater diameter than said front carriage wheels.

11. An assembly according to claim 6 further comprising a gun rack fixed to one of said first pair of struts and adapted to support a gun above said one of said struts in the transport configuration.

12. An assembly according to claim 6 further comprising a flash light holder fixed to the assembly and adapted to directing a light beam from a flashlight inserted therein forwardly of the assembly in the transport configuration.

13. An assembly according to claim 6, said platform having a V-shaped edge opposite said one edge thereof.

14. An assembly according to claim 13, said V-shaped edge having teeth thereon.

15. A rearrangable assembly having a tree stand configuration and an equipment transport configuration comprising:

a ladder having a first pair of parallel tubular struts spaced by a plurality of rungs fixed therebetween hingedly connected at an end portion thereof between and to an end portion of a second pair of parallel tubular struts spaced by a plurality of rungs fixed therebetween for 180 degree rotation from a folded substantially horizontal condition in the transport configuration to an open substantially vertical condition in the stand configuration, said end portions having apertures therethrough aligned in the stand configuration for insertion of removable pins therein to lock said pairs of struts in the stand configuration, said first pair of struts each having a pair of substantially perpendicular studs each having an aperture therethrough depending from another end portion thereof in the transport configuration;

a platform having tubular members extending approximately perpendicularly therefrom proximate one edge thereof and hingedly connected between said other end portion of said first pair of struts for approximately 90 degree rotation between a substantially horizontal condition with said members extending downwardly in the stand configuration and a substantially horizontal condition with said members extending upwardly in the transport configuration, said members and said another end portion of said first pair of struts having apertures therethrough aligned in the stand and transport configurations for insertion of removable pins therein to lock said members to said first pair of struts in the stand and transport configurations;

a main carriage having a tubular frame for receiving said studs therein with the assembly in the transport configuration, said frame having apertures aligned with said stud apertures for insertion of removable pins therein to lock said main carriage to said studs in the transport configuration and a pair of wheels journalled for rotation about a shaft on said frame;

a front carriage having studs extending substantially horizontally therefrom for insertion into said one end of said first pair of tubular struts in the transport configuration, said studs having apertures aligned with said strut apertures for insertion of removable pins therein to lock said front carriage to said struts in the transport configuration and a pair of wheels journalled for rotation about a shaft on said frame; and a steering frame having a pair of studs substantially perpendicularly depending therefrom for insertion into said platform tubular members in the transport configuration, said studs having apertures aligned with said member apertures for insertion of removable pins therein to lock said steering frame to said platform members in the transport configuration.

16. An assembly according to claim 15 further comprising a shaft having L-shaped end portions journalled to said main carriage frame for rotation about an axis transverse to said struts into and out of frictional engagement with said main carriage wheels, an arm extending radially from said shaft and an operating rod journalled at a yoked end to a free end of said arm by a removable pin and extending over said steering frame to a forked end of said rod whereby a pulling motion on said forked end engages said L-shaped portions with said main carriage wheels in the transport configuration and said yoked end is engaged with one of said rungs by said removable pin and said forked end abutted against a tree in the stand configuration.

17. An assembly according to claim 16 further comprising a strap having one end connected to said forked end and another end connectible to said forked end with a tree girted by said strap.

18. An assembly according to claim 15, said platform having a V-shaped edge opposite said one edge thereof.

19. An assembly according to claim 18 further comprising a belt having one end connected to said platform and another end connectible to said platform with a tree girted by said strap with said V-shaped edge against said tree in the stand configuration and with an object atop said folded ladder girted by said strap in the transport configuration.

* * * * *